(12) United States Patent
Lee et al.

(10) Patent No.: US 9,136,049 B2
(45) Date of Patent: Sep. 15, 2015

(54) MAGNESIUM—ALUMINIUM MAGNETIC POWDER AND METHOD FOR MAKING SAME

(75) Inventors: Jung-Goo Lee, Changwon-si (KR); Chul-Jin Choi, Changwon-si (KR)

(73) Assignee: Korea Institute of Machinery & Materials, Daejon (KR)

( * ) Notice: Subject to any disclaimer, the term of this patent is extended or adjusted under 35 U.S.C. 154(b) by 819 days.

(21) Appl. No.: 13/499,245

(22) PCT Filed: Nov. 10, 2009

(86) PCT No.: PCT/KR2009/006570
§ 371 (c)(1), (2), (4) Date: Jun. 11, 2012

(87) PCT Pub. No.: WO2011/040669
PCT Pub. Date: Apr. 7, 2011

(65) Prior Publication Data
US 2012/0234136 A1      Sep. 20, 2012

(30) Foreign Application Priority Data
Sep. 30, 2009   (KR) .................. 10-2009-0092939

(51) Int. Cl.
| | |
|---|---|
| *H01F 1/08* | (2006.01) |
| *B22F 1/00* | (2006.01) |
| *B82Y 30/00* | (2011.01) |
| *C22C 1/04* | (2006.01) |
| *H01F 1/047* | (2006.01) |

(52) U.S. Cl.
CPC ............... *H01F 1/08* (2013.01); *B22F 1/0018* (2013.01); *B82Y 30/00* (2013.01); *C22C 1/04* (2013.01); *C22C 1/0416* (2013.01); *B22F 2998/10* (2013.01); *H01F 1/047* (2013.01)

(58) Field of Classification Search
CPC .................................. H01F 1/08; B22F 1/0018
USPC ...................................................... 252/62.55
See application file for complete search history.

(56) References Cited

U.S. PATENT DOCUMENTS 4,802,931 A    2/1989  Croat
5,645,651 A    7/1997  Fujimura et al.

FOREIGN PATENT DOCUMENTS

JP        59-46008     3/1984
JP        S609852 A    1/1985

*Primary Examiner* — Weiping Zhu
(74) *Attorney, Agent, or Firm* — Heidi L. Eisenhut, Esq.; Loza & Loza, LLP

(57) ABSTRACT

This invention relates to Mn—Al magnetic powders of a high coercive force which are obtained from Mn—Al alloy vaporized by plasma arc discharging, and a manufacturing method thereof.

The Mn—Al magnetic powders are produced by discharging a plasma arc to a compact which is formed by compacting a blend containing 20-60% by weight of Mn powder and 40-80% by weight of Al powder, collecting nanoscale Mn—Al particles after cooling the vaporized blend, and heat-treating the particles.

According to the present invention, the Mn—Al magnetic powders of light weight and enhanced corrosion resistance are produced at a low cost.

13 Claims, 9 Drawing Sheets

MAGNESIUM—ALUMINIUM MAGNETIC POWDER AND METHOD FOR MAKING SAME

CROSS-REFERENCE TO RELATED APPLICATIONS

This application is the U.S. national stage of International Patent Application No. PCT/KR2009/06570, filed on Nov. 10, 2009, which claims the benefit of priority from Korean Patent Application No. 10-2009-0092939, filed Sep. 30, 2009. The disclosures of the foregoing applications are incorporated herein by reference in their entirety.

BACKGROUND OF THE INVENTION

1. Field of the Invention

This invention relates to Mn—Al magnetic powders and a manufacturing method thereof, more particularly, Mn—Al magnetic powders of a high coercive force which are obtained from Mn—Al alloy vaporized by plasma arc discharging, and a method for manufacturing the magnetic powders.

2. Description of Related Art

Ferrite magnets or ferrites are generally produced as sintered products using technologies in the powder metallurgy field, and comprise iron oxide as their principal component and barium or strontium depending on their applications.

The ferrites are classified as dry process products using special binding powders and wet process products using water according to making-process, and also as isotropic type and anisotropic type according to the direction of magnetism.

Because of their low price, the ferrites have various applications including speakers, motors, health care equipments, tools for learning, tachometers, TVs, lead switches, watch movements and so on.

The most widely-used type of rare earth magnet is a neodymium magnet. The neodymium magnet is produced by sintering raw materials such as iron oxide, boron, and neodymium which is one of rare earth elements (17 elements: atomic numbers are #21, #39, and #59 to #71), and has a high value of energy product. Typically it has been used in the light, thin, short, and small cutting-edge product.

Japanese patent publication no. 1984-46008 discloses a rare earth magnet manufactured by sintering, and no. 1985-9852 discloses a method for manufacturing rare earth magnets by high speed quenching.

Rare earth magnets have the highest value of energy product (25~50 MGOe) among the commercialized magnets.

However, the rare earth magnets tend to be vulnerable to corrosion as a shortcoming, since they comprise one or more of rare earth elements and iron which are relatively susceptible to oxidation. Therefore, a protective coating is needed to avoid the surface oxidation, which leads to a higher manufacturing cost.

It is an object of the invention to provide Mn—Al magnetic powders of a high coercive force which are obtained from Mn—Al alloy vaporized by plasma arc discharging, and a method for manufacturing the powders.

It is another object of the invention to provide Mn—Al magnetic powders of light weight and enhanced corrosion resistance, and a method for manufacturing the powders.

SUMMARY OF THE INVENTION

According to the present invention, there is provided Mn—Al magnetic powders which are produced by discharging a plasma arc to a compact which is formed by compacting a blend containing 20-60% by weight of Mn powder and 40-80% by weight of Al powder, collecting nanoscale Mn—Al particles after cooling the vaporized blend, and heat-treating the particles.

According to the present invention, carbon is added to the nanoscale Mn—Al particles.

The Mn—Al magnetic powders have a particle diameter less than 200 nm.

Some of the Mn—Al magnetic powders are in a state of τ phase.

The Mn—Al magnetic powders have a coercive force of 4 kOe or more.

According to the present invention there is provided a method of manufacturing Mn—Al magnetic powders, the method comprising the steps of; preparing Mn in powder and Al in powder; mixing the Mn powder with the Al powder in order to obtain a blend of the Mn powder and the Al powder; forming a compact by compacting the blend of the Mn powder and the Al powder, making nanoscale Mn—Al particles by charging the compact into a plasma generating equipment, evaporating the compact under plasma arc discharging, and collecting the nanoscale Mn—Al particles; and producing the Mn—Al magnetic powders by heat-treating the nanoscale Mn—Al particles.

The blend obtained in the mixing step contains 20-60% by weight of Mn powder and 40-80% by weight of Al powder.

The blend is obtained by mixing the Mn powder with the Al powder according to a dry process.

The step of forming a compact includes compacting the blend uniaxially.

The step of making nanoscale Mn—Al particles is performed under an atmosphere consisting of Ar gas and $H_2$ gas.

The step of producing the Mn—Al magnetic powders includes heat-treating the nanoscale Mn—Al particles during 30 minutes in a temperature between 400° C. and 500° C.

Some of the Mn—Al magnetic powders are changed into a state of τ phase during the step of producing the Mn—Al magnetic powders.

Carbon is optionally added to the nanoscale Mn—Al particles in the step of making nanoscale Mn—Al particles.

The Mn—Al magnetic powders have a coercive force of 4 kOe or more.

According to the present invention, the Mn—Al magnetic powders of light weight and enhanced corrosion resistance are produced at a low cost.

DETAILED DESCRIPTION OF MAIN ELEMENTS

Figure 1:
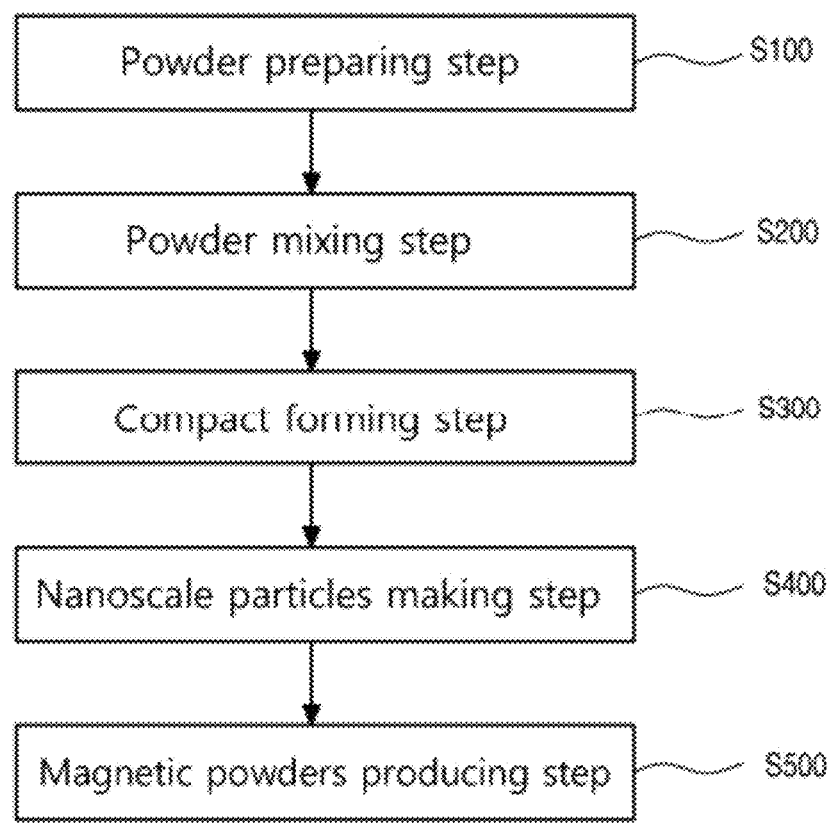
FIG. 1 is a flow chart showing a sequence of steps manufacturing the Mn—Al magnetic powders according to the present invention.

1: Blend of raw material powders
2: Compact
3: Nanoscale Mn—Al particles
100: Plasma generating equipment
110: Door
120: Carrying gas supplying duct
122: Air pump
130: Cooling duct
132: Vacuum pump
140: Electrode
150: Gas supplying system
200: Filtering section
S100: Powder preparing step
S200: Powder mixing step
S300: Compact forming step
S400: Nanoscale particles making step
S500: Magnetic powders producing step

DESCRIPTION OF SPECIFIC EMBODIMENTS

The invention will be better understood by reference to the following description of the embodiments of the invention taken in conjunction with the accompanying drawings.

The method of present invention will be described by reference to FIGS. 1 and 2.

Figure 2:
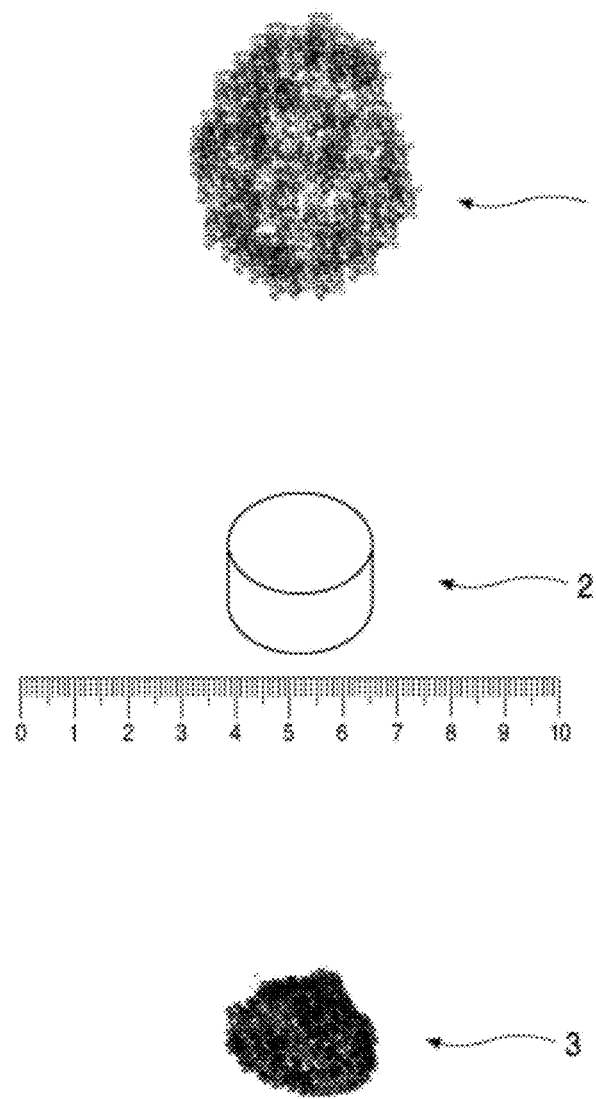
FIG. 2 is a set of photos showing a blend of raw material powders, a compact, and nanoscale Mn—Al particles according to the present method.

FIG. 1 is a flow chart showing a sequence of steps manufacturing the Mn—Al magnetic powders according to the present invention and FIG. 2 is a set of photos showing a blend of raw material powders, a compact, and nanoscale Mn—Al particles according to the present method.

As seen from the flow chart, manufacturing of the Mn—Al magnetic powders according to the invention requires a sequence of processing steps. The steps comprise a powder preparing step (S100), in which Mn powder and Al powder are prepared, a powder mixing step (S200), in which the Mn powder is mixed with the Al powder, a compact forming step (S300), in which a compact (2) is formed by compacting a blend (1) obtained from mixing the Mn powder with the Al powder in the preceding stage, a nanoscale particles making step (S400), in which the compact (2) is charged into a plasma generating equipment (100) and evaporated under plasma arc discharging, and the nanoscale particles (3) are collected from the vaporized blend, and a magnetic powders producing step (S500), in which the Mn—Al powders are produced by heat-treating the nanoscale Mn—Al particles (3).

In the powder preparing step (S100), the Mn powder of a micron size and the Al powder of a micron size are provided as raw material. The Mn powder and the Al powder are completely mixed according to a dry process recipe already known to one of ordinary skill in the art and, as a result, their blend (1) is produced in the powder mixing step (S200). The blend (1) obtained in the powder mixing step (S200) contains 20-60% by weight of Mn powder and 40-80% by weight of Al powder.

Then, the blend (1) goes through the compact forming step (S300). In the step (S300), the blend (1) is charged into a mold and compacted uniaxially in the mold. As seen from FIG. 2, the compact (2) of a cylindrical shape with a low height is formed. The compact (2) may have any shape within the above weight ratio of Mn powder and Al powder.

Then, the compact (2) is changed to the nanoscale Mn—Al particles through the nanoscale particles making step (S400). In the step (S400) the compact (2) is charged into the plasma generating equipment (100) and evaporated under plasma arc discharging. The nanoscale particles are collected from the vapor.

Figure 3:
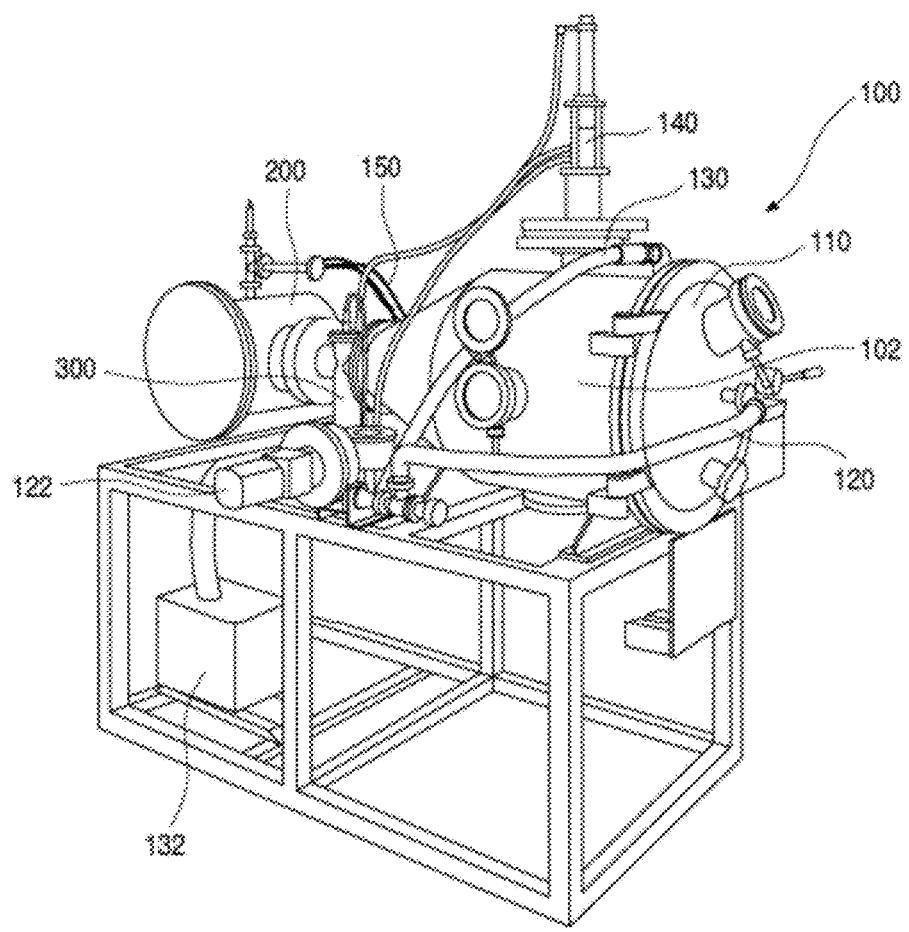
FIG. 3 is a perspective view of a plasma generating equipment for producing the Mn—Al magnetic powders according to the present invention.

The plasma generating equipment (100) will be described by reference to FIG. 3. FIG. 3, in a perspective view, shows the plasma generating equipment for producing the Mn—Al magnetic powders according to the present invention.

The plasma generating equipment (100) comprises a vacuum chamber (102). The vacuum chamber (102) is maintained in a vacuum state to prevent impurities in the air from flowing in. The compact (2) is charged into the vacuum chamber (102) which is filled with a mixed gas consisting of Ar gas and $H_2$ gas after charging the compact, and melted by a plasma arc.

A vapor phase is produced during the melting of the compact (2) and the nanoscale Mn—Al particles (3) are obtained by condensing the vapor phase. A carrying gas is used to separate the nanoscale Mn—Al particles (3) from the mixed gas. For the purpose of this separation, a filtering section (200) is provided with the plasma generating equipment (100). The filtering section (200) comprises a proper filtering medium (not shown) which collects the nanoscale Mn—Al particles (3) from the mixed gas.

The plasma generating equipment (100) has a door (110) for charging the compact (2). The door (110) is rotatably attached to the body of the vacuum chamber (102). In the shown state, the door (100) is hinged at the left side and, therefore, rotates to the left side to open. The door (110) is preferably equipped with a proper locking mechanism.

A carrying gas supplying duct (120) is constructed such that the carrying gas flows into the plasma generating equipment (100) in order to carry the nanoscale Mn—Al particles produced within the vacuum chamber to the filter section which, in the shown state, exists in the left side of the vacuum chamber. One end of the carrying gas supplying duct (120) is connected to the center of the door (110) and the other end of the carrying gas supplying duct is connected to an air pump (122).

A cooling duct (130) is equipped along the upper part of the outer surface of the vacuum chamber (102). The cooling duct (130) is constructed such that cooling water circulates through the interior part of the plasma generating equipment (100). When a plasma arc is generated, the atmosphere within the plasma generating equipment (100) remains in a so high temperature having the range of 5,000~10,000 K that the compact may readily be evaporated. The cooling duct (130) supplies the cooling water to freeze down such high temperature atmosphere. The cooling water circulates through a cooling tower (not shown), the interior part of the plasma generating equipment (100), and a water pump (not shown) to cool down the high temperature atmosphere.

In the lower part of the cooling duct (130), a vacuum pump (132) is provided. The vacuum pump (132) evacuates air from the interior space of the plasma generating equipment (100).

An electrode (140) is mounted in the upper/lower part of the outer periphery of the vacuum chamber in the plasma generating equipment (100). The electrode (140) remains in a state that one end of the electrode is inserted into the interior space of the plasma generating equipment (100) to generate the plasma arc.

In the shown state, at the left side of the plasma generating equipment (100), the plasma generating equipment (100) further incorporates a gas supplying system (150) consisting of a number of independent ducts. Gases such as plasma generating gas and insulating gas, etc are supplied within the plasma generating equipment (100) by way of respective ducts in the gas supplying system (150).

Finally, the nanoscale Mn—Al particles (3) produced in the plasma generating equipment (100) changes into the Mn—Al magnetic powders through the magnetic powders producing step (S500). A small amount of carbon may be added in the nanoscale Mn—Al particles, which is embodied in the following example.

EXAMPLE

The blends (1) used in this example had ratios of 20-60% by weight of Mn powder and 40-80% by weight of Al powder. The interior space of the vacuum chamber (102) was filled with a mixture of Argon gas and hydrogen gas. The pressure in the vacuum chamber (102) remained at about $4.0 \times 10^4$ Pa while filling the mixture gas. The electrode (140) was applied an electric current of 220~300 A and an electric power of 16~24 V. A tungsten rod was used as the electrode (140). Also the carrying gas consisting of argon and hydrogen gas was used. A graphite crucible or carbon of a fine powder state was used to add carbon to the nanoscale Mn—Al particles. The object of carbon addition is to increase the amount of the nanoscale Mn—Al particles in a state of $\epsilon$ phase while going through the nanoscale particles making step (S400).

Figure 4:
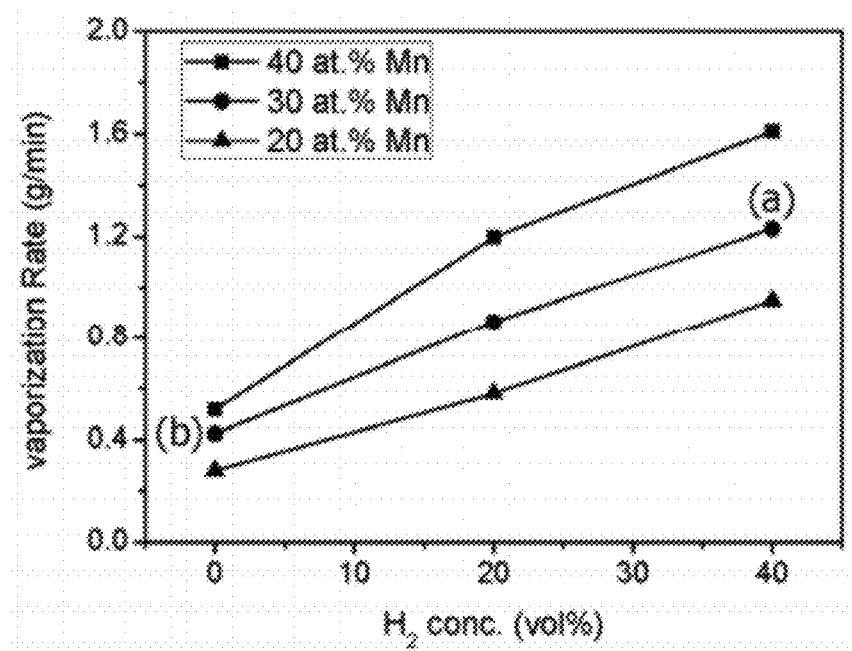
FIG. 4 is a graph showing the relationship between the amount of hydrogen gas and the vaporization rate of the law material powders.

FIG. 4 shows the variation of the raw material powders' vaporization rate according to the amount of hydrogen gas in the nanoscale particles making step (S400). The raw material powers' vaporization rate increases as the amount of hydrogen gas increases. Also, as the content of Mn in the raw material powders increases, the vaporization rate increases, since the vaporization pressure of Mn is higher than that of Al.

Figure 5:
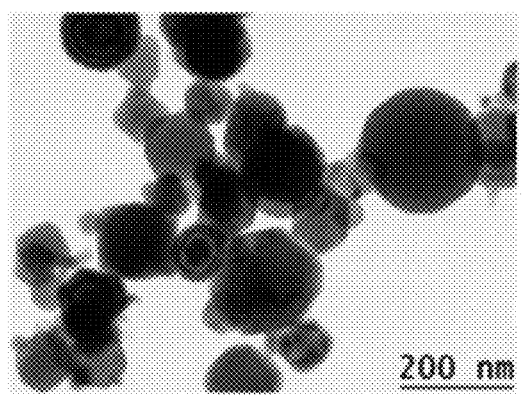
FIG. 5 is a couple of photos showing the nanoscale Mn—Al particles obtained at two positions (a) and (b) of FIG. 4.
Figure 5:
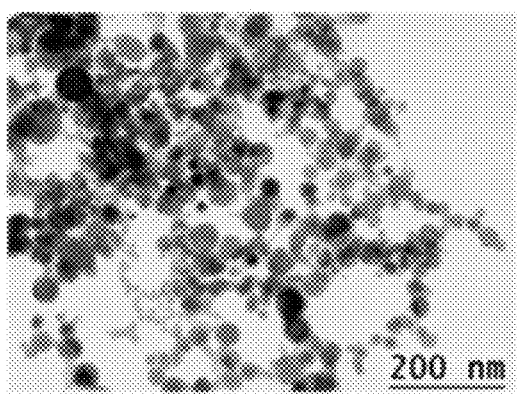

As seen from FIG. 5, the particle diameter of the nanoscale Mn—Al particles obtained at the position (a) in which the content of hydrogen is 40% by volume, is larger than that of those obtained at the position (b) in which there is no hydrogen. That is, the particle diameter of the nanoscale Mn—Al particles obtained at the position (a) is 200 nm or less, and the particle diameter at the position (b) is 50 nm or less.

Figure 6:
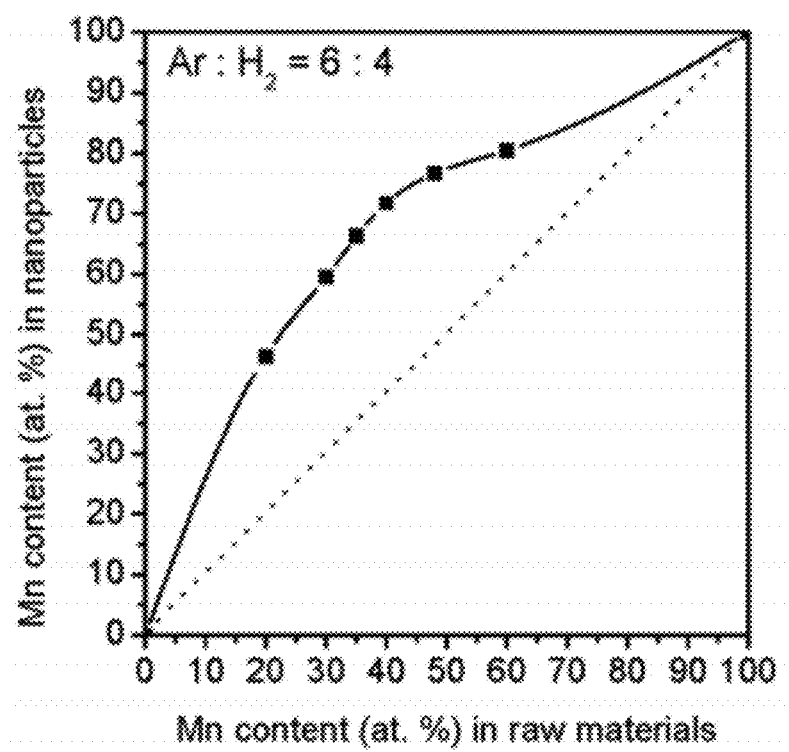
FIG. 6 is a graph showing the relationship between the amount of Mn in the nanoscale Mn—Al particles and the amount of Mn in the raw material powders.

As seen from FIG. 6, which shows the variation of the amount of Mn in the nanoscale Mn—Al particles according to the amount of Mn in the raw material powders, the amount of Mn in the nanoscale Mn—Al particles is higher than that of Mn in the raw material powders.

Figure 7:
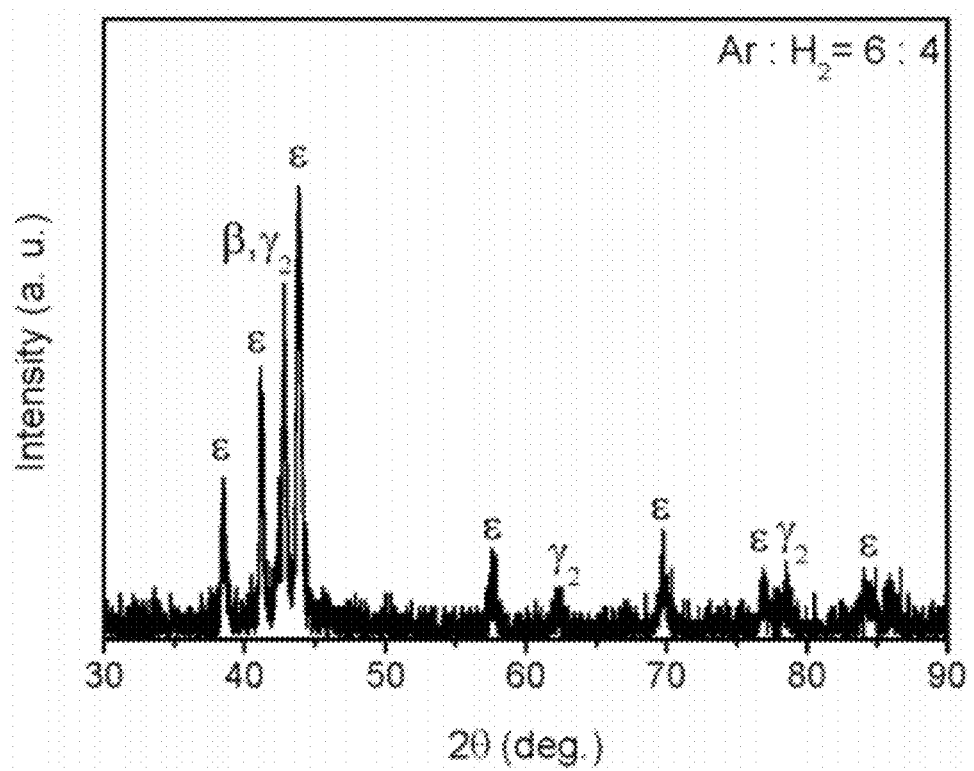
FIG. 7 is a graph showing a pattern of X-ray diffraction of the nanoscale Mn—Al particles obtained from the present method.

FIG. 7 is a graph showing a pattern of X-ray diffraction of the nanoscale Mn—Al particles obtained in the nanoscale particles making step (S400) according to the present method. As seen from FIG. 7, a major portion of the nanoscale Mn—Al particles is in a state of $\epsilon$ phase, while only a small portion of the particles is in a state of $\beta_1, \gamma_2$. The nanoscale Mn—Al particles (3) having such phase characteristics changed to those having phase characteristics shown in FIG. 8 while going through the magnetic powders producing step (S500).

Figure 8:
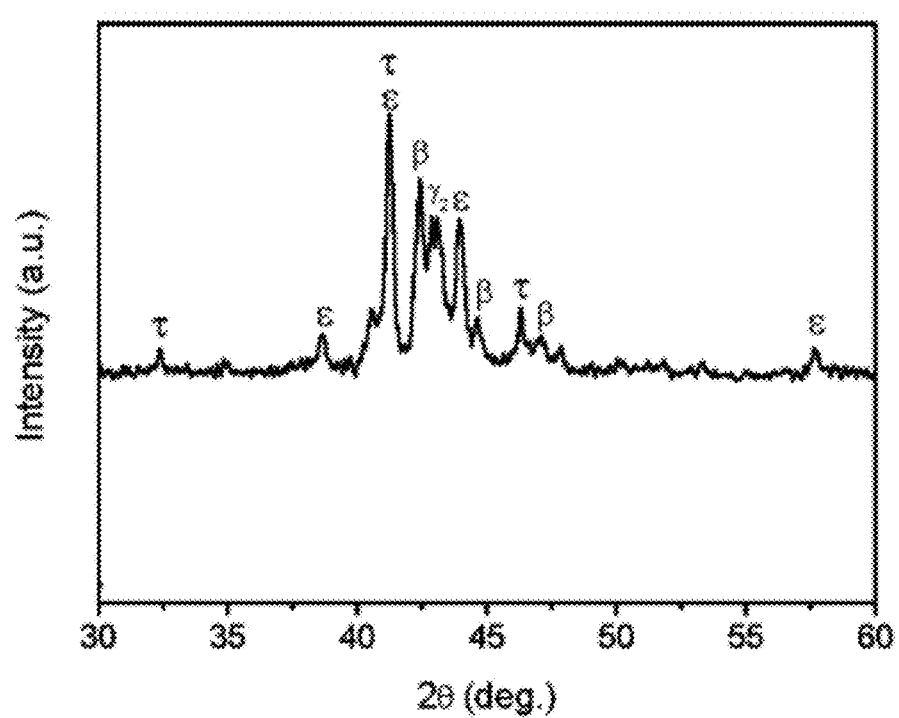
FIG. 8 is a graph showing a pattern of X-ray diffraction of the Mn—Al magnetic powders obtained from the present method.

FIG. 8 is a graph showing a pattern of X-ray diffraction of the Mn—Al magnetic powders obtained from the present method. In the magnetic powders producing step (S500), the nanoscale Mn—Al particles were heat-treated during 30 minutes in a temperature 400° C. As seen from FIG. 8, some of the Mn—Al magnetic powders are changed into a state of $\tau$ phase after the heat treating.

Figure 9:
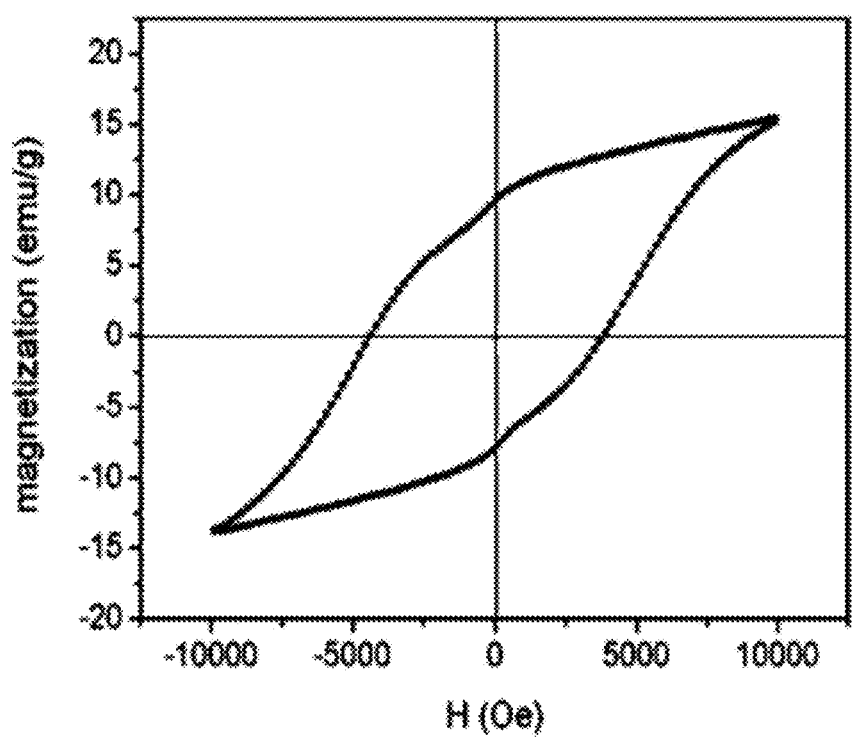
FIG. 9. Is a graph showing the coercive force and saturation magnetization values of the Mn—Al magnetic powders obtained from the present method.

As seen from FIG. 9, the Mn—Al magnetic powders obtained in the magnetic powders producing step (S500) have a coercive force of 4 kOe or more and a saturation magnetization of 15.4 emu/g or more.

As described above, in the present invention, the nanoscale Mn—Al particles are produced by evaporating the compact consisting of Mn powder and Al powder under the plasma arc, and the Mn—Al magnetic powders of $\tau$ phase are produced by heat-treating the nanoscale Mn—Al particles.

According to the present invention, the Mn—Al magnetic powders of light weight and enhanced corrosion resistance are produced. In the case of the present invention, the production cost is relatively low, since the manufacturing method is simple and productivity is high. Also, since the mixing ratio of Mn powder and Al powder in the compact can be varied, the composition of the magnetic powders can be selected depending on the need of the consumers. Therefore, product competitiveness for the magnetic powder obtained from the present invention is relatively high.

Numerous characteristics and advantages of the invention meant to be described by this document have been set forth in the foregoing description. It is to be understood, however, that while particular forms or embodiments of the invention have been illustrated, various modifications to shape, and arrangement of parts, and the like, can be made without departing from the spirit and scope of the invention.

What is claimed is:

1. Mn—Al magnetic powders produced by discharging a plasma arc to a compact which is formed by compacting a blend containing 20-60% by weight of Mn powder and 40-80% by weight of Al powder, collecting nanoscale Mn—Al particles after cooling the vaporized blend, and heat-treating the particles.

2. The Mn—Al magnetic powders according to claim 1, wherein carbon is added to the nanoscale Mn—Al particles.

3. The Mn—Al magnetic powders according to claim 2, wherein the Mn—Al magnetic powders have a particle diameter less than 200 nm.

4. The Mn—Al magnetic powders according to claim 3, wherein some of the Mn—Al magnetic powders are in a state of $\tau$ phase.

5. The Mn—Al magnetic powders according to claim 1 wherein the Mn—Al magnetic powders have a coercive force of 4kOe or more.

6. A method of manufacturing Mn—Al magnetic powders, the method comprising the steps of:
   preparing Mn in powder and Al in powder,
   mixing the Mn powder with the Al powder in order to obtain a blend of the Mn powder and the Al powder,
   wherein the blend contains 20-60% by weight of Mn powder and 40-80% by weight of Al powder,
   forming a compact by compacting the blend of the Mn powder and the Al powder,
   making nanoscale Mn—Al particles by charging the compact into a plasma generating equipment, evaporating the compact under plasma arc discharging and collecting the nanoscale Mn—Al particles, and
   producing the Mn—Al magnetic powders by heat-treating the nanoscale Mn—Al particles.

7. The method according to claim 6, wherein the blend is obtained by mixing the Mn powder with the Al powder according to a dry process.

8. The method according to claim 6, wherein the step of forming a compact includes compacting the blend uniaxially.

9. The method according to claim 6, wherein the step of making nanoscale Mn—Al particles is performed under an atmosphere consisting of Ar gas and $H_2$ gas.

10. The method according to claim 6, wherein the step of producing the Mn—Al magnetic powders includes heat-treating the nanoscale Mn—Al particles during 30 minutes in a temperature between 400° C. and 500° C.

11. The method according to claim 10, wherein the Mn—Al magnetic powders are changed into a state of $\tau$ phase during the step of producing the Mn—Al magnetic powders.

12. The method according to claim 6, wherein carbon is optionally added to the nanoscale Mn—Al particles in the step of making nanoscale Mn—Al particles.

13. The method according to claim 6, wherein the Mn—Al magnetic powders have a coercive force of 4kOe or more.

* * * * *